Figure 1:
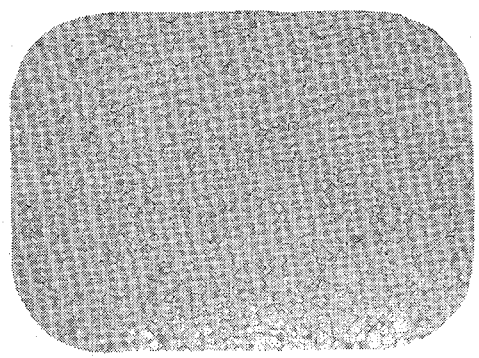

Jan. 31, 1967  H. H. RICE ETAL  3,301,781
METHOD OF MAKING MAGNESIUM FLUORIDE ARTICLES
Filed Oct. 27, 1964

SAMPLE A
MAGNESIUM FLUORIDE

SAMPLE B
MAGNESIUM FLUORIDE
+ 0.5% BY WEIGHT
OF LITHIUM FLUORIDE

SAMPLE C
MAGNESIUM FLUORIDE
+ 0.5% BY WEIGHT
OF VANADIUM PENTOXIDE

INVENTORS
Hal H. Rice &
Maurice J. Garey
BY
Peter P. Kozak
ATTORNEY 3,301,781
METHOD OF MAKING MAGNESIUM
FLUORIDE ARTICLES
Hal H. Rice, Birmingham, and Maurice J. Garey, Warren, Mich., assignors to General Motors Corporation, Detroit, Mich., a corporation of Delaware
Filed Oct. 27, 1964, Ser. No. 406,850
13 Claims. (Cl. 252—12)

This invention relates generally to magnesium fluoride articles, such as bearings, and a method of making same. More particularly, this invention relates to a method of improving the sintering behavior of magnesium fluoride powders and the resultant physical properties of the sintered article.

Magnesium fluoride has heretofore been widely used in industry for many applications, such as a protective coating for optical elements and the like or as an ingredient in ceramic tiles, due to its durability and high degree of corrosion and wear resistance. More recently, magnesium fluoride has been used in bearing applications because of these desirable properties, and also, its excellent inherent lubricity, as exemplified by United States Patent No. 3,104,917 Schwartzwalder, which issued on September 24, 1963, and is assigned to the assignee of the present invention.

In applications wherein articles are fabricated from or with magnesium fluoride powder using sintering techniques, it has heretofore often been necessary to employ the relatively expensive, highest purity or "Optical" grades of magnesium fluoride powders in order to obtain a suitable degree of densification and fine-grain size in the resultant sintered article. Of course, the properties of high density and fine-grain size are particularly desirable in bearing applications and the like, since they result in improved wear resistance and structural strength in the sintered article. Also, in fabricating articles from or with magnesium fluoride, it has heretofore been necessary to employ relatively expensive fabrication methods, such as high temperature sintering and/or hot pressing techniques in order to obtain suitable physical properties, such as high density and fine-grain size, in the article.

Therefore, it is a principal object of the present invention to provide a method of making sintered magnesium fluoride articles whereby the sintering behavior of magnesium fluoride and the resultant physical properties of the sintered article, particularly the properties of density, fine-grain size and structural strength are improved.

It is another object of the present invention to provide a method of fabricating articles from magnesium fluoride wherein relatively inexpensive low temperature sintering and cold pressing techniques may be suitably employed instead of the aforementioned relatively expensive fabrication techniques, such as high temperature sintering and/or hot pressing.

It is a further object of the present invention to provide a method of fabricating articles from relatively inexpensive, low purity grades of magnesium fluoride powder using a sintering technique whereby a high degree of densification, strength and fine-grain size are obtained in the resultant sintered articles, which properties are comparable to and in some instances superior to those obtained using relatively expensive, high purity or "Optical" grades of magnesium fluoride and conventional sintering techniques.

It is still a further object to provide articles, such as bearings, and a relatively inexpensive method of making same from magnesium fluoride, whereby the resultant article has excellent properties of durability, light weight, wear resistance, corrosion resistance and excellent inherent lubricity.

Basically, these and other objects are accomplished in accordance with the present invention by adding to a suitable grade of magnesium fluoride powder of the desired mesh size a relatively small but effective amount of at least one powdered sintering aid or additive selected from the group which includes any lithium halide salt and the pentoxide compounds of vanadium, phosphorus and arsenic, intimately mixing the additive and magnesium fluoride powder, compacting the powdered mixture into the desired article size and shape, and then sintering the compacted article. The magnesium fluoride powder is preferably calcined prior to the mixing step to remove any water of hydration or other volatile matter from the powder in order to reduce the degree of firing shrinkage of the compacted powdered article during the sintering step. The reduction in firing shrinkage is particularly important in fabricating articles, such as bearings and the like, where a very small degree of dimensional change is required when the article is sintered. After the calcination treatment, the powder is preferably ball-milled to provide the desired mesh size powder prior to mixing it with the subject sintering additives, and also, to break up any agglomerates in the magnesium fluoride powder resulting from the calcination treatment.

Figure 2:
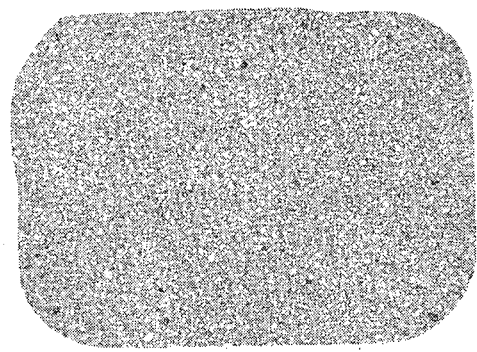
Figure 3:
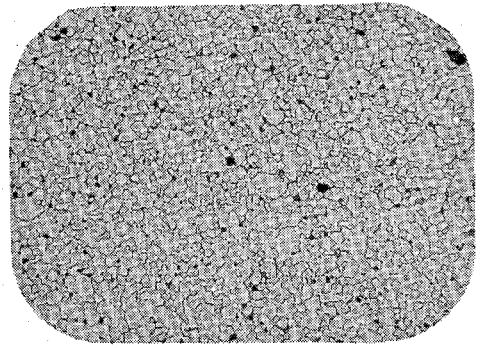

Other objects, features and advantages of the present invention will become apparent from the following detailed description of certain embodiments and specific examples thereof, taken in conjunction with the accompanying drawing, in which:

FIGURE 1 is a photomicrograph (500 X) of a sintered article made from a relatively inexpensive standard grade of magnesium fluoride powder which does not contain the subject sintering additives of the present invention;

FIGURE 2 is a photomicrograph (500 X) of a sintered article, such as a bearing element, made from the same standard grade of magnesium fluoride powder as the article shown in FIGURE 1, except that the article shown in FIGURE 2 includes about 0.5% by weight, of lithium fluoride and was made and sintered in accordance with the present invention; and FIGURE 3 is a photomicrograph (500 X) of a sintered article, such as a bearing element, made from the same standard grade of magnesium fluoride powder as the article shown in FIGURE 1, except that the article shown in FIGURE 3 includes about 0.5% by weight, of vanadium pentoxide and was made and sintered in accordance with the present invention.

Magnesium fluoride is commercially available in several different grades of powders, which are normally classified and sold at prices reflecting the degree of purity of the material. For instance, the most expensive, highest purity, commercially available grade of magnesium fluoride is generally referred to in the art as "Optical" grade material and has a purity which usually ranges between about 99.90% to about 99.98%. Other less expensive, commercially available grades of magnesium fluoride include a "Standard Luminescent" grade having a purity of about 99.0% to about 99.90% and a "Technical" grade having a purity which may range from about 90.0% to about 99.0%. A typical spectographic chemical analysis of each of the three aforementioned grades of powder is set forth in Table I below:

TABLE I—QUANTITATIVE SPECTROGRAPHIC ANALYSIS OF THREE DIFFERENT MAGNESIUM FLUORIDE POWDERS IN PERCENT, BY WEIGHT

|  | Optical Grade | Standard Luminescent Grade | Technical Grade |
| --- | --- | --- | --- |
| Magnesium fluoride | 99.98 | 99.88 | 98.87 |
| Aluminum | 0.005 | 0.0005 | 0.01 |
| Silicon | 0.005 | 0.0005 | 0.5 |
| Manganese | (¹) | 0.001 | 0.01 |
| Chromium | (¹) | (¹) | 0.001 |
| Iron | 0.005 | 0.001 | 0.5 |
| Calcium | 0.00001 | 0.003 | 0.1 |
| Tin | (¹) | (¹) | 0.0005 |
| Copper | 0.0001 | 0.0005 | 0.0005 |
| Sodium | (¹) | 0.1 | (¹) |
| Titanium | (¹) | (¹) | 0.0005 |
| Nickel | (¹) | (¹) | 0.002 |

¹ None detected.

The high purity or "Optical" grades of magnesium fluoride powders generally provide the best sintering characteristics and physical properties of densification and fine-grain size in the resultant sintered article, which, as previously mentioned, are very desirable in bearing applications and the like. However, under current market conditions, a typical high purity "Optical" grade of magnesium fluoride powder, such as that set forth in Table I, is approximately ten times more expensive than the typical "Standard Luminescent" grade magnesium fluoride powder and about one hundred times more expensive than the typical "Technical" grade magnesium fluoride powder, which are also set forth in Table I. Hence, it is desirable to upgrade the sintering behavior and resultant physical properties of densification and fine-grain size in an article formed by sintering the low purity, less expensive grades of magnesium fluoride in order to provide greatly increased economy and versatility in the use of magnesium fluoride for any of the aforementioned purposes. As previously mentioned, this may be accomplished in accordance with the present invention through the use of small amounts of sintering aids or additives which include any lithium halide salt or phosphorus pentoxide, arsenic pentoxide or vanadium pentoxide.

More particularly, as will hereinafter be more fully explained, we have found that a gram atomic percent addition of about 0.6 to about 1.8, and preferably about 1.2 of at least one or more of the powdered lithium halide salts, which include lithium fluoride, lithium chloride, lithium bromide and lithium iodide, to the aforementioned lower purity grade powders of magnesium fluoride is very effective in providing very substantial improvements in sintering behavior and densification and grain size in the resultant sintered article. Also, similar beneficial results have been obtained by a gram atomic percent addition of about 0.1 to about 0.3, and preferably about 0.2 of at least one or more metallic pentoxides which include phosphorus pentoxide, arsenic pentoxide or vanadium pentoxide to the aforementioned lower purity grade powders of magnesium fluoride. As used herein, "a gram atomic percent addition" refers to the ratio of the number of gram atoms of sintering additive which are added to the number of gram atoms of magnesium fluoride present in the powder. Also, the degree of purity of the magnesium fluoride powder should not be less than about 90%, and preferably should not be less than about 95% to provide beneficial results in accordance with the present invention.

The subject method of forming sintered magnesium fluoride articles, such as bearings, may be advantageously carried out in the following manner. Preferably, a suitable grade of magnesium fluoride powder having a mesh size of less than about 325 mesh is first calcined to remove any water of hydration or other volatile matter from the powder in order to minimize the amount of thermal firing shrinkage which occurs, when the article is subsequently sintered in a compacted form. The calcination treatment may be carried out in any suitable manner and apparatus wherein the magnesium fluoride powder may be heated to a temperature ranging from about 800° F. to about 1300° F. for a sufficient time, which is normally at least one hour, in a suitable environment, such as an inert argon atmosphere.

For instance, the sintered articles shown in FIGURES 1, 2 and 3 of the drawing, hereinafter referred to as Samples A, B and C, respectively, were all fabricated from powdered magnesium fluoride having the same composition as the "Standard Luminescent" grade material set forth in Table I, and a particle size ranging from about 0.1 micron to about 10 microns, the average particle size being about 2.5 microns. However, in each instance, the magnesium fluoride powder was first calcined at a temperature of about 1200° F. for about one hour in a porcelain container through which argon was passed at a gas flow rate of about 10 cubic feet per hour. Of course, it should be appreciated that the calcination treatment may be varied somewhat in accordance with the present invention or even omitted, if desired.

For instance, the magnesium fluoride powder may be heated to the desired calcination temperature in an air environment, provided that it is carried out in such a manner to remove the water and other volatile matter without causing the formation of undesirable large amounts of magnesium oxide in the powder, which may be detrimental to the resultant sintered article. Moreover, in addition to reducing the thermal firing shrinkage of the magnesium fluoride powder, the calcination treatment also serves to slightly lower the optimum sintering temperature and to improve the density and integrity of the sintered article. In this application, by optimum sintering temperature, we refer to the temperature at which maximum densification of the magnesium fluoride powder and additive may be obtained.

As previously mentioned, after the calcination treatment, the magnesium fluoride powder is preferably ground in a suitable apparatus for a sufficient time to break up any agglomerates so that the bulk of the material may pass through a 325 mesh sieve. In the instance of Samples A, B and C shown in FIGURES 1, 2 and 3, respectively, in the drawing, the calcined magnesium fluoride powder was dry ball-milled for about 16 hours to obtain a magnesium fluoride powder having a particle size ranging from about 0.1 micron to about 10 microns. The ball-milling step normally results in improved densification of the resultant sintered article. Of course, the ball-milling step may be omitted when the magnesium fluoride powder has a suitable mesh size for compaction and sintering.

The subject sintering aids or additives of the present invention may be mixed with the magnesium fluoride powder in any suitable manner to provide a homogeneous mixture. As previously mentioned, in the instance of the lithium halide additives, the amount of additive used may vary between about 0.6 to about 1.8, but is preferably about 1.2 gram atomic percent of the magnesium fluoride in the resultant powdered mixture. Also, in the instance of the additives consisting of the pentoxides of vanadium, phosphorus and arsenic, the amount of additive used may vary between about 0.1 to about 0.3, but is preferably about 0.2 gram atomic percent of the magnesium fluoride in the resultant mixture. The subject sintering additives of the present invention should preferably be in powdered form and have a mesh size of less than about 325 mesh.

In accordance with the present invention, the mixing step may be advantageously carried out by intimately wet mixing the powdered magnesium fluoride and additives in a receptacle containing a suitable vehicle which forms a slurry or suspension with the powders. Although many types of vehicles may be used to form the slurry, ethyl alcohol is an excellent vehicle to use for this purpose, since the magnesium fluoride and additive powders are insoluble in ethyl alcohol and the ethyl alcohol may be readily evaporated to leave a dry powdered mixture. The slurry may be agitated by any suitable means to ensure the uniform dispersion of the sintering additive and the magnesium fluoride powder. The use of a conventional ultrasonic mixing technique, wherein sound waves are used to agitate the slurry, is very suitable for this purpose, since it greatly minimizes the tendency of the powders in the slurry to gel or agglomerate in the vehicle. After the mixing step is completed, the slurry preferably is passed through a screen to remove any remaining fine agglomerates or coarse foreign matter, and the vehicle is then evaporated by any suitable means to provide a dry powdered mixture of magnesium fluoride and additive.

For example, in the instance of Sample B shown in FIGURE 2 of the drawing, the magnesium fluoride powder was intimately wet mixed with about 0.5%, by weight, or 1.2 gram atomic percent of the powdered lithium fluoride sintering additive in an ethyl alcohol vehicle using ultrasonic agitation means. Similarly, in the instance of Sample C shown in FIGURE 3 of the drawing, the magnesium fluoride powder was intimately wet mixed with about 0.5%, by weight, or .2 gram atomic percent of the powdered vanadium pentoxide in an ethyl alcohol vehicle using ultrasonic agitation means. After a homogeneous slurry mixture was obtained in both instances, the slurry was passed through a 200 mesh screen, and the ethyl alcohol was then evaporated at a temperature of about 160° F. to leave a dry powdered mixture.

In accordance with the present invention, upon completion of the mixing step, the dry powdered mixture of magnesium fluoride and sintering additive is next placed in a suitable conventional cold-press or isostatic compaction device and subjected to a sufficient amount of pressure to form a powdered compact having the desired size and shape of the article being produced. However, prior to the compaction step, the dry powdered mixture is preferably mixed with about 2%, by weight, of a binder which may consist of paraffin dissolved in naphtha and then granulated to a size that will pass through a 20 mesh screen. Although the binder is desirable to improve the structural strength of the sintered article, it is not required. The amount of compacting pressure may vary up to about 50,000 p.s.i., depending on the results desired, although a pressure of about 40,000 p.s.i. appears to reduce warpage and unequal shrinkage of the article during sintering. Accordingly, the above-mentioned binder was incorporated in Samples A, B and C, which were then formed to the desired article size and shape in conventional isostatic compaction devices under a pressure of about 40,000 p.s.i.

After the cold-pressing or isostatic-forming step has been completed, the compacted magnesium fluoride articles, which include the subject sintering additives, are then sintered in accordance with the present invention. The sintering step may be carried out in a conventional manner using any suitable apparatus, such as an electrically heated furnace, wherein the magnesium fluoride compacts containing the subject sintering additives of the present invention may be heated to the desired or optimum sintering temperature in an appropriate atmosphere or environment. Of course, the sintering process conditions may vary considerably in accordance with the present invention depending on the results desired. For instance, the compacts may be heated in an air atmosphere or an inert atmosphere, such as argon, or under a vacuum depending on the results desired and the other process conditions employed, such as the sintering temperature, size of the compact, the time required to sinter the compact, and the compact composition.

When the subject lithium halide sintering additives of the present invention are included in the magnesium fluoride compacts, we have found that an air or an inert atmosphere of argon may be advantageously employed. When magnesium fluoride powders are conventionally sintered without the subject sintering aids or additives of the present invention, the optimum sintering temperature, from the standpoint of obtaining maximum densification, is normally in excess of about 1700° F. However, when the subject lithium halide sintering additives are included in the aforementioned proportions in the powdered compacts, the optimum sintering temperature may range between about 1150° F. to about 1300° F., depending on which lithium halide salt is employed. Hence at these relatively low sintering temperatures, an air atmosphere may be conveniently employed without causing excessive oxidation of the resultant sintered article, provided that the article is not sintered for an excessive amount of time. The optimum sintering temperature when the subject metallic pentoxide additives are used in accordance with the present invention may vary between about 1500° F to about 1800° F.

The exact chemical and atomic mechanisms by which the subject sintering additives of the present invention function during the sintering step of the subject process are not clearly understood. However, it is believed that the improvements which are obtained in the sintering behavior of magnesium fluoride powders, such as lowering the optimum sintering temperature, are due to the creation of anion or cation vacancies in the magnesium fluoride molecules when the powdered mixture is heated during the sintering step of the subject process. For instance, since the lithium halide particles begin to melt at a relatively low temperature upon being heated during the sintering step, lithium cations are made available which attract electrons from the fluorine atoms in the magnesium fluoride molecules, thereby creating anionic vacancies in the magnesium fluoride molecules. The creation of these additional anionic vacancies in the magnesium fluoride molecules occurs at lower temperatures than the normal melting point of the magnesium fluoride powder and enhances the diffusion processes which results in the consolidation and sintering of the magnesium fluoride grains at lower temperatures than if the lithium halide is not used. The resulting material has a dense, fine-grained sintered structure, and we have found that lithium fluoride is a particularly potent sintering aid for use in accordance with the present invention.

In the instance of the subject metallic pentoxide sintering aids or additives, such as vanadium pentoxide, arsenic pentoxide and phosphorus pentoxide, the improvements in the sintering behavior and the resultant physical properties of the sintered magnesium fluoride article are believed to result from the creation of cation vacancies in the magnesium fluoride molecules. For instance, vanadium pentoxide, arsenic pentoxide and phosphorus pentoxide have relatively low melting or fusion temperatures as compared to magnesium fluoride and are sources of small, highly polarizable +5 cations. Hence, when, for instance, vanadium pentoxide is melted upon being heated during the sintering step of the subject process, vanadium +5 cations are made available and intermolecular forces set up which attract the magnesium atoms in the magnesium fluoride molecules and create cation vacancies in the magnesium fluoride molecules. The creation of these cationic vacancies and the intermolecular forces involved cause the desired fusion or sintering of the magnesium fluoride particles into a dense, fine-grained, sintered structure. Furthermore, since the subject sintering aids or additives are used in relatively small amounts in accordance with the present invention, they do not have a deleterious effect on the wear and corrosion resistance or the inherent lubricity qualities of the resultant sintered magnesium fluoride article.

In order to demonstrate the improvements in sintering behavior and the resultant physical properties of the sintered article, reference is made to Samples A, B and C shown in FIGURES 1, 2 and 3, respectively, of the drawing. After the presintering treatment previously described, Sample A, which did not contain any sintering additive, was placed in an "Inconel" retort inside a conventional electric furnace through which an argon atmosphere was circulated at a gas flow rate of about 10 cubic feet per hour. Sample A was then gradually heated at a rate of about 400° F. per hour to a temperature of and C approaches the theoretical density of 3.17 grams per cubic centimeter for magnesium fluoride and is comparable to that of conventionally hot pressed "Optical" grade material as set forth in Table I which normally has a density of about 3.16 grams per cubic centimeter and an average grain size of about 2.0 microns. Other examples of magnesium fluoride articles which have been fabricated in accordance with the present invention using the subject sintering additives are listed in Table II below.

TABLE II.—EFFECT OF SOME ADDITIVES ON THE SINTERING BEHAVIOR OF MAGNESIUM FLUORIDE POWDER

| Magnesium Fluoride Material (See Table I) | Additive Material | Weight Percent Additive | Gram Atomic Percent Additive Cation | Sintering Atmosphere | Optimum Sintering Temperature, °F. | Sintered Density (g./cm.³) | Average Sintered Grain Size (microns) |
|---|---|---|---|---|---|---|---|
| Standard Luminescent Grade | LiF | 0.25 | 0.6 | Argon | 1,270 | 3.10 | 2.5 |
| Do | LiF | 0.75 | 1.8 | do | 1,250 | 3.06 | 5.5 |
| Do | $V_2O_5$ | 0.25 | .1 | do | 1,760 | 3.07 | 6.0 |
| Do | $V_2O_5$ | 0.75 | .3 | do | 1,785 | 3.06 | 5.0 |
| Do | LiF | 0.5 | 1.2 | Air | 1,170 | 3.12 | 2.0 |
| Do | LiCl | 0.8 | 1.2 | Air | 1,275 | 3.03 | 2.0 |
| Do | LiBr | 1.7 | 1.2 | Air | 1,220 | 3.09 | 2.0 |
| Do | LiI | 3.6 | 1.2 | Air | 1,275 | 3.12 | 2.0 |
| Do | $P_2O_5$ | 0.5 | 0.25 | Argon | 1,600 | 3.12 | 4.5 |
| Do | $As_2O_5$ | 0.5 | 0.15 | do | 1,500 | 3.10 | 3.5 |
| Technical Grade | LiF | 0.5 | 1.2 | do | 1,355 | 3.02 | 4.5 |
| Do | $V_2O_5$ | 0.5 | .2 | do | 1,650 | 3.03 | 5.5 | about 1710° F. and maintained at that temperature for about one hour and then gradually cooled to room temperature. The sintering temperature of 1710° F. provided maximum densification of the resultant sintered article for this particular grade of magnesium fluoride powder. Sample A was then polished and ground in a conventional manner, and tests were conducted that determined that Sample A had a density of about 3.12 grams per cubic centimeter and an average sintered grain size of about 5.5 microns.

Sample B, shown in FIGURE 2 of the drawing, which contains about 0.5%, by weight, or 1.2 gram atomic percent of lithium fluoride, was sintered in a manner similar to Sample A after the calcination, ball-milling and mixing steps previously described. However, in the instance of Sample B, the sintering step was carried out by first gradually heating Sample B at about 400° F. per hour to a temperature of about 1170° F. and maintaining it at that temperature for about one hour in argon atmosphere circulating at a rate of 10 cubic feet per hour, and then gradually cooling it to room temperature. Sample B was then polished and ground in a conventional manner, and tests were conducted that determined that Sample B had a density of about 3.11 grams per cubic centimeter and an average grain size of about 2.0 microns. As will clearly be observed by comparing FIGURES 1 and 2 of the drawing, Sample B has a much finer grain size than Sample A, and consequently, Sample B has better structural strength, durability and wear resistance than Sample A, which properties are particularly desirable in bearing applications and the like.

Sample C, shown in FIGURE 3 of the drawing, which contains about 0.5%, by weight, or 1.2 gram atomic percent of vanadium pentoxide, was sintered in a manner similar to Samples A and B after the calcination, ball-milling and mixing steps previously described. However, in the instance of Sample C, the sintering step was carried out by first gradually heating Sample C at a rate of about 400° F. per hour to a temperature of about 1670° F., maintaining it at that temperature for about one hour and then gradually cooling it to room temperature. Sample C was next ground and polished in a conventional manner, and tests were conducted that determined that Sample C had a density of about 3.11 grams per cubic centimeter and an average grain size of about 4.0 microns.

Thus, as in the instance of Sample B, the finer grain size of Sample C provides for improved structural strength, durability and wear resistance over Sample A which did not contain any of the subject sintering additives of the present invention. The density of Samples B and C approaches the theoretical density of 3.17 grams Therefore, from the foregoing, it will be appreciated that the use of the subject sintering aids or additives of the present invention substantially improves the sintering behavior of magnesium fluoride and the resultant physical properties of the sintered article, particularly regarding densification and fine-grain size. Moreover, these improvements may be obtained with most commercially available grades of magnesium fluoride, including the less expensive low purity grades, and also, the high purity "Optical" grades. Furthermore, the use of the subject sintering additives permits the use of relatively inexpensive process techniques, such as low temperature sintering and cold pressing or isostatic forming techniques, rather than the more expensive high temperature sintering and hot pressing techniques previously used in fabricating articles from magnesium fluoride.

While we have described our invention in terms of certain preferred embodiments and specific examples thereof, it is not intended to be limited thereby, and it should be understood that other variations may be apparent to those skilled in the art and are within the intended scope of the invention as defined by the following claims.

We claim:

1. A method of forming a sintered high strength magnesium fluoride article which comprises mixing a small but effective amount of at least one powdered sintering additive selected from the group consisting of lithium halide salts, vanadium pentoxide, arsenic pentoxide and phosphorus pentoxide with a magnesium fluoride powder, compacting the powdered mixture, and subsequently sintering said compacted powdered mixture to form said article.

2. A method of forming a sintered high strength magnesium fluoride article which comprises adding to and intimately mixing with a magnesium fluoride powder about 0.6 to about 1.8 grams atomic percent of at least one powdered lithium halide salt, compacting the powdered mixture, and subsequently sintering said compacted powdered mixture to form said article.

3. A method of forming a sintered high strength magnesium fluoride article which comprises adding to and intimately mixing with a magnesium fluoride powder about 0.1 to about 0.3 gram atomic percent of at least one powdered sintering additive selected from the group consisting of vanadium pentoxide, arsenic pentoxide and phosphorus pentoxide, compacting the powdered mixture, and subsequently sintering said compacted powdered mixture to form said article.

4. A method of forming a sintered high strength magnesium fluoride bearing element which comprises intimately mixing with a magnesium fluoride powder about 0.5%, by weight, of lithium fluoride powder, compacting the powdered mixture, and subsequently sintering said compacted powdered mixture to form said bearing element.

5. A method of forming a sintered high strength magnesium fluoride article having a high density and fine-grain size comprising the steps of calcining a magnesium fluoride powder to remove any volatile matter from said powder, thereby reducing the thermal firing shrinkage of said powder during the subsequent sintering step, adding a small amount of only one powdered sintering additive selected from the group consisting of lithium halide salts and the pentoxide compounds of vanadium, arsenic and phosphorus to form a homogeneous mixture, said amount of said sintering additive ranging between about 0.6 to about 1.8 gram atomic percent of said magnesium fluoride powder when one of said lithium halide salts is being added, said amount of said sintering additives ranging between 0.1 to about 0.3 gram atomic percent of said magnesium fluoride powder when one of said pentoxide compounds is being added, compacting said powdered mixture, and subsequently sintering said compacted powdered mixture in a suitable environment to provide a dense, fine-grained sintered article.

6. A method of forming a sintered high strength magnesium fluoride article comprising calcining a magnesium fluoride powder having a purity of not less than about 90% and a mesh size ranging up to about 325 mesh by heating said powder to a temperature ranging between about 800° F. to about 1300° F., grinding said calcined powder to a suitable particle size which may range between about 0.5 micron to about 10 microns, intimately mixing said powder with a small but effective amount of a sintering additive selected from the group which consists of lithium fluoride, lithium chloride, lithium bromide, lithium iodide, vanadium pentoxide, arsenic pentoxide and phosphorus pentoxide to provide a homogeneous powdered mixture, compacting said powdered mixture by suitable means under sufficient pressure to form a compact having good structural integrity, and subsequently sintering said compact by heating it at a suitable temperature for a sufficient time in a suitable environment to provide a dense, fine-grained, durable, lightweight, strong sintered article.

7. A method of forming a sintered high strength magnesium fluoride article comprising the steps of calcining a magnesium fluoride powder of at least about 95% purity and having a mesh size ranging up to about 325 mesh by heating said powder at a temperature ranging between about 800° F. to about 1300° F. in an inert argon atmosphere for at least about one hour, ball-milling the calcined powder for a sufficient time to provide a powder having a particle size ranging from about 0.5 micron to about 10 microns, intimately wet mixing said ball-milled magnesium fluoride powder in an ethyl alcohol vehicle with about 1.2 gram atomic percent of at least one powdered sintering additive having a mesh size ranging up to about 325 mesh and being selected from the group consisting of lithium fluoride, lithium chloride, lithium bromide and lithium iodide to form a slurry, agitating said slurry by ultrasonic means to obtain a homogeneous mixture of said magnesium fluoride powder and said powdered additive, evaporating said vehicle to leave a dry powdered mixture, isostatically compacting said dry powdered mixture under a sufficient pressure which may range up to about 50,000 p.s.i. to form a compacted article, gradually heating said compacted article to its optimum sintering temperature in an air atmosphere for a sufficient time to form a sintered article having a high density and fine-grain size, and subsequently cooling said sintered article.

8. A sintered high strength article which comprises magnesium fluoride and a small but effective amount of at least one compound selected from the group which includes lithium halide salts and the pentoxide compounds of vanadium, arsenic and phosphorus.

9. A sintered high strength article which comprises a dense, fine-grained, compacted sintered magnesium fluoride powder including about 0.6 to about 1.8 gram atomic percent of at least one lithium halide salt.

10. A sintered high strength article which comprises a dense, fine-grained, compacted sintered magnesium fluoride powder including about 0.1 to about 0.3 gram atomic percent of at least one compound selected from the group consisting of vanadium pentoxide, arsenic pentoxide and phosphorus pentoxide.

11. A sintered high strength bearing element which comprises magnesium fluoride powder having about 1.2 gram atomic percent of a lithium halide sintering additive uniformly dispersed throughout said powder, said powder being compacted and sintered in the form of a bearing element.

12. A sintered high strength bearing element which comprises magnesium fluoride powder having uniformly dispersed therethrough about 0.2 gram atomic percent of a sintering additive selected from the group consisting of vanadium pentoxide, arsenic pentoxide and phosphorus pentoxide, said powder being compacted and sintered in the form of a bearing element.

13. A dense, fine-grained, durable, lightweight, sintered strong bearing element which comprises a compacted sintered magnesium fluoride powder having a purity of at least about 90% and including, by weight, about 0.5% of lithium fluoride.

References Cited by the Examiner

UNITED STATES PATENTS

| | | | |
|---|---|---|---|
| 2,446,251 | 8/1948 | Stricklin | 252—25 |
| 3,051,659 | 8/1962 | Troelstra | 252—25 |
| 3,104,917 | 9/1963 | Schwartzwalder | 308—9 |

FOREIGN PATENTS

| | | |
|---|---|---|
| 673,836 | 6/1952 | Great Britain. |
| 913,175 | 12/1962 | Great Britain. |

DANIEL E. WYMAN, *Primary Examiner.*

I. VAUGHN, *Assistant Examiner.*